US011238212B1

(12) United States Patent
Mueller et al.

(10) Patent No.: US 11,238,212 B1
(45) Date of Patent: Feb. 1, 2022

(54) SYSTEMS AND METHODS FOR GENERATING MAINTENANCE DATA

(71) Applicant: RailWorks Corporation, New York, NY (US)

(72) Inventors: Justin Mueller, Friendswood, TX (US); Robert Rolf, Seabrook, TX (US); Richard Stephens, Pasadena, TX (US)

(73) Assignee: RailWorks Corporation, New York, NY (US)

( * ) Notice: Subject to any disclaimer, the term of this patent is extended or adjusted under 35 U.S.C. 154(b) by 210 days.

(21) Appl. No.: 15/890,969

(22) Filed: Feb. 7, 2018

Related U.S. Application Data

(60) Provisional application No. 62/455,812, filed on Feb. 7, 2017.

(51) Int. Cl.
| | |
|---|---|
| *G06F 17/00* | (2019.01) |
| *G06F 40/174* | (2020.01) |
| *G06F 21/31* | (2013.01) |
| *G06Q 10/00* | (2012.01) |
| *G06F 16/951* | (2019.01) |
| *G06Q 30/00* | (2012.01) |

(52) U.S. Cl.
CPC .......... *G06F 40/174* (2020.01); *G06F 16/951* (2019.01); *G06F 21/31* (2013.01); *G06Q 10/20* (2013.01); *G06Q 30/018* (2013.01)

(58) Field of Classification Search
CPC .. G06Q 10/0639; G06Q 10/20; G06Q 30/018; G06F 17/243; G06F 40/174; G06F 16/951; G06F 21/31
See application file for complete search history.

(56) References Cited

U.S. PATENT DOCUMENTS

| | | | | |
|---|---|---|---|---|
| 5,867,404 A | * | 2/1999 | Bryan | B61L 23/048 714/724 |
| 2007/0003919 A1 | * | 1/2007 | Stevenson | G09B 7/02 434/350 |

(Continued)

OTHER PUBLICATIONS

Khan et al., Integration of Structural Health Monitoring and Intelligent Transportation Systems for Bridge Condition Assessment: Current Status and Future Direction, 2016, IEEE, p. 2107-2122 (Year: 2016).*

*Primary Examiner* — Andrew T McIntosh
(74) *Attorney, Agent, or Firm* — McCarter & English, LLP

(57) ABSTRACT

Described in detail herein are methods and systems dynamically generating maintenance data. The system includes a first computing system which can receive identification credentials associated with a user. The second computing system can receive the identification credentials associated with the user. The second computing system can authenticate the identification credentials associated with the user. The second computing system can determine whether the user is a first type or a second type in response to authenticating the identification credentials associated with the user. The second computing system can dynamically generate and display an editable form with empty fields, on the interactive display of the first computing system, in response to determining the user is of a first type. The second computing system can dynamically populate and display a read-only report on the interactive display of the first computing system, in response to determining the user is of a second type.

23 Claims, 5 Drawing Sheets

(56) References Cited

U.S. PATENT DOCUMENTS

| | | | | |
|---|---|---|---|---|
| 2007/0217670 | A1* | 9/2007 | Bar-Am | B61L 23/041 382/141 |
| 2010/0064241 | A1* | 3/2010 | Tays | G06F 16/2455 715/771 |
| 2014/0072173 | A1* | 3/2014 | Haas | G06T 7/74 382/103 |
| 2014/0200827 | A1* | 7/2014 | Bhattacharjya | B61K 9/08 702/34 |
| 2014/0282943 | A1* | 9/2014 | Nikankin | H04L 63/0884 726/6 |
| 2014/0325331 | A1* | 10/2014 | Madireddi | G06F 17/243 715/224 |
| 2015/0213149 | A1* | 7/2015 | Halevi | G06F 3/04847 715/753 |
| 2017/0103229 | A1* | 4/2017 | Gellas | G06F 21/602 |

* cited by examiner

SYSTEMS AND METHODS FOR GENERATING MAINTENANCE DATA

CROSS-REFERENCE TO RELATED APPLICATION

The present application claims priority benefit to a provisional patent application entitled "Systems and Methods for Generating Maintenance Data," which was filed on Feb. 7, 2017, and assigned Ser. No. 62/455,812. The entire content of the foregoing provisional application is incorporated herein by reference.

BACKGROUND

Generating maintenance data and reports for railway tracks can be completed using a web portal. Various users can access the web portal and complete reports and view maintenance data for the railway tracks.

BRIEF SUMMARY

In one embodiment, a system for generating maintenance data includes, a first computing system including an interactive display. The first computing system is programmed receive identification credentials associated with a user and transmit the identification credentials. The system further includes a second computing system including a server and a database storing a plurality of forms associated with maintenance data. Each form includes a plurality of fields. The second computing system is communicatively coupled to the first computing system. The second computing system is programmed to receive the identification credentials associated with the user, authenticate the identification credentials associated with the user, and determine whether the user is a first type or a second type in response to authenticating the identification credentials associated with the user. The second computing system is further programmed to, dynamically generate and display at least one form of the plurality of forms with at least one empty field, on the interactive display of the first computing system, in response to determining the user is of a first type. The at least one form is editable. The second computing system is further programmed to, dynamically populate and display at least one form of the plurality of forms on the interactive display of the first computing system, in response to determining the user is of a second type, wherein the at least one form is read-only.

In another embodiment, a method for generating maintenance data includes receiving, via a first computing system including an interactive display, identification credentials associated with a user and transmitting, via the first computing system, the identification credentials. The method further includes, receiving, via a second computing system including a server and a database storing a plurality of forms associated with maintenance data, each form including a plurality of fields, and communicatively coupled to the first computing system, the identification credentials associated with the user. The method further includes, authenticating, via the second computing system, the identification credentials associated with the user, determining, via the second computing system, whether the user is a first type or a second type in response to authenticating the identification credentials associated with the user. The method further includes dynamically generating and displaying, via the second computing system, at least one form of the plurality of forms with at least one empty field, on the interactive display of the first computing system, in response to determining the user is of a first type, wherein the at least one form is editable and dynamically populating and displaying, via the second computing system, at least one form of the plurality of forms on the interactive display of the first computing system, in response to determining the user is of a second type, wherein the at least one form is read-only.

BRIEF DESCRIPTION OF DRAWINGS

To assist those of skill in the art in making and using the system for generating maintenance data and associated methods, reference is made to the accompanying figures. The accompanying figures, which are incorporated in and constitute a part of this specification, illustrate one or more embodiments of the invention and, together with the description, help to explain the invention. Illustrative embodiments are shown by way of example in the accompanying drawings and should not be considered as limiting. In the figures.

DETAILED DESCRIPTION

Described in detail herein are methods and systems dynamically generating maintenance data. The system includes a first computing system which can receive identification credentials associated with a user. The first computing system can include a web application and an interactive display on which the first computing system can receive input associated with the identification credentials. The second computing system can receive the identification credentials associated with the user. The second computing system can authenticate the identification credentials associated with the user. The second computing system can determine whether the user is a first type or a second type in response to authenticating the identification credentials associated with the user. The second computing system can dynamically generate and display an editable form with empty fields, on the interactive display of the first computing system, in response to determining the user is of a first type. The second computing system can dynamically populate and display a read-only form on the interactive display of the first computing system, in response to determining the user is of a second type. It can be appreciated a read-only form can be a report generated by converting the filled out form fields into read-only elements.

Figure 1A:
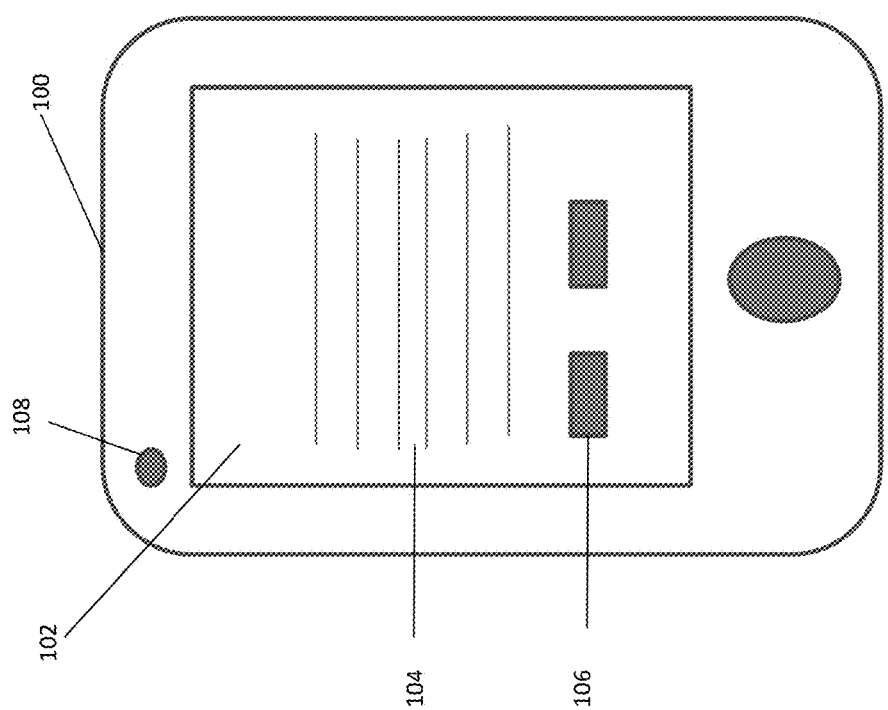
FIG. 1A is a block diagram of exemplary user device according to an example embodiment.

FIG. 1A is a block diagram of exemplary first computing system according to an example embodiment. In exemplary embodiments, a user can operate a first computing system 100. The first computing system 100 can include an interactive display 102 displaying a user interface. The first computing system 100 can also include an image capturing device 108. The image capturing device 108 can be positioned on the front and/or rear of the first computing system. The first computing system 100 can be a wireless device, a portable device, a wearable computer, a cellular or mobile phone, a portable digital assistant (PDA), a smart phone, a tablet, an ultrabook, a netbook, a laptop, or some other electronic device equipped with internet accessibility.

A user can launch a web-application on the first computing system 100. For example, the web-application can be a railway track management and control application. The user can view and input information using the interactive display 102. For example, the user interface can display a form 104 and the user can enter information into the form. The form can have selection buttons 106 and the user can submit the input using the selection button. In some embodiments, the interactive display can be a multi-touch interface. In other embodiments, the user can interact with the interactive display using a mouse or keyboard. The user can also capture moving or still images using the image capturing device 108, and upload the moving or still images and submit the images using the executed web-application.

Figure 1B:
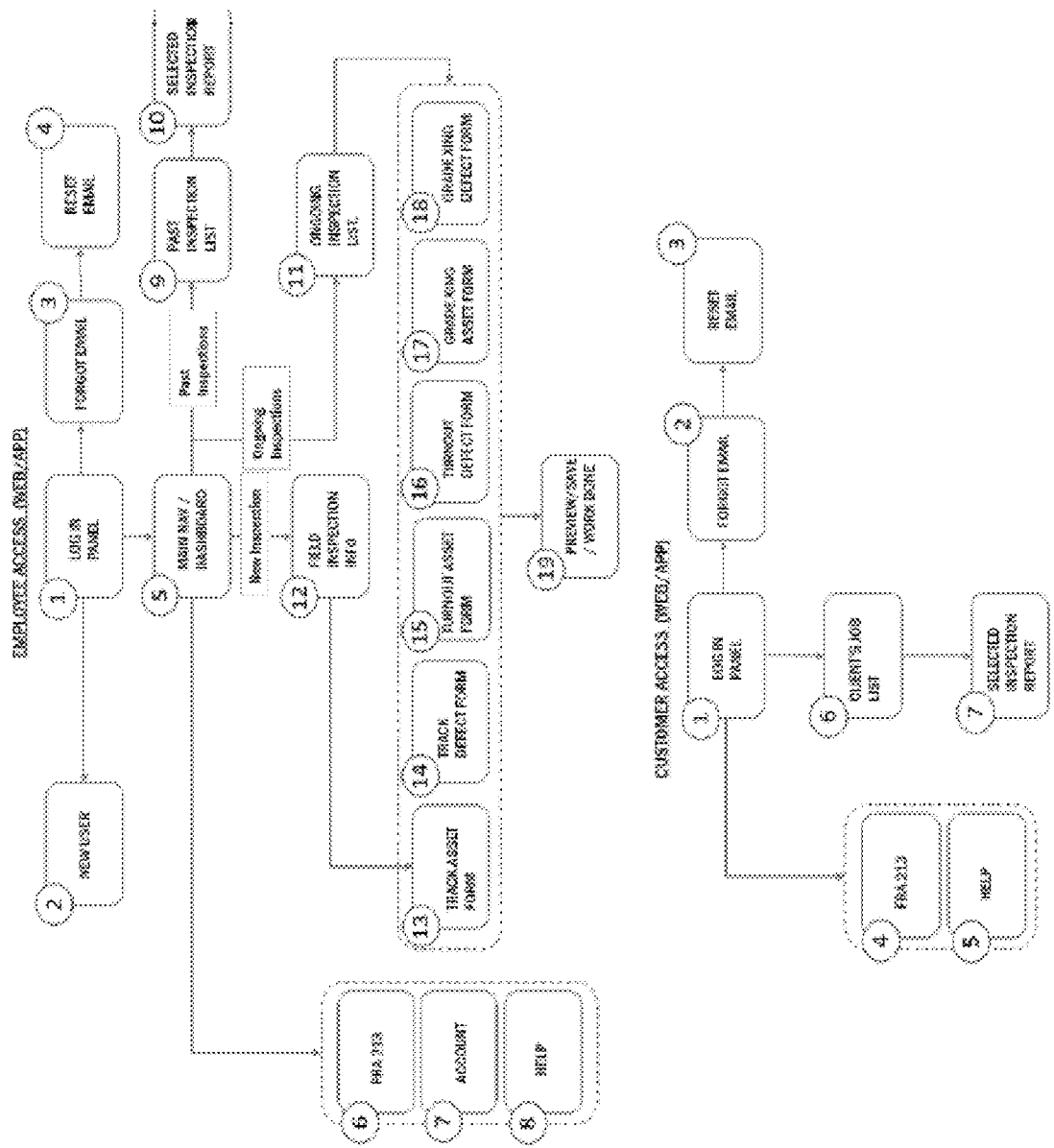
FIG. 1B is a diagram illustrating the flow of an exemplary user interface according to an example embodiment.

FIG. 1B is a diagram illustrating the flow of an exemplary user interface according to an example embodiment. As mentioned above the user can execute or launch a web application on the first computing system. As a non-limiting example, the user can launch or execute a railway track management and control web-application. The railway track management and control web-application can be used to initiate a new inspection report, view/complete an ongoing inspection report and/or view past inspection reports. The web-application can include a user interface. Various users can interact with the railway track management and control web-application, via the user interface.

For example, in response to execution of the web-application a user interface can display a log-in panel. A user can input their username and password to login to the web-application. In one example, the username can be a registered e-mail address. Optionally, the user can indicate that they are a new user. The user interface can prompt the user to enter their information on a new registration form. The information can include the first name, the last name, e-mail address/username and a password. The user can be prompted to input the password two times. The user can also indicate that they have forgot their password. In response to the user indicating that they have forgot their password, the user interface can prompt the user to enter their e-mail address. In response to the e-mail address being recognized, the user can be transmitted a link to reset their password and a "reset e-mail is sent" message can be displayed on the user interface. In response to the e-mail address not being recognized, the user can be prompted to enter a different e-mail.

Subsequent to inputting the user information and/or creating a new account the user can be authenticated and directed to a main navigation or dashboard. The main navigation or dashboard can vary based on the type of user. The user can be a super administrator, administrator, employee or customer/client. The super administrator, administrator, or employee can add/edit/delete assets and defects on inspection forms. The super administrator, administrator, employee and customer/client can view/print/sort inspection reports. In addition to inspection reports, the super administrator, administrator, employee and customer/client can view/print/sort overview reports. The overview reports include breakdowns of overall quantities priorities, and budget numbers without individual assets and defects. In addition to inspection reports, the super administrator, administrator, employee and customer/client can also view/print/sort defect reports. The defect reports include defects but do not show pricing for crew members. In response to determining the user is an employee, an employee dashboard can be displayed on the user interface. The employee can navigate to new, current (ongoing), or past inspections. The employee can access the menu to go to FRA 213 regulations, account, and help resources. In response to navigating to a past inspections, a past inspection list can be displayed for the employee. The past inspection list can be filtered based on the user. In some embodiments, the inspection list can also be filtered by the location of the first computing system. The past inspection list can include all the past inspections in chronological order. The employee can sort the list by date/apathetical order or job list. The employee can also search the past inspection list based on client/project, name/yard or facility name. The employee can also filter the past inspection list to show only his/her/inspection jobs. The employee can select an inspection from the past inspection list. The employee can view the saved report of the selected inspection and/or create a copy of the previous inspection to start a new inspection report. The employee can change the status of previous inspection defect items to "complete", "in-progress", or "not started" on the various defect reports.

In response to navigating to ongoing inspections, the employee can be presented a list of all inspections that have been created but not yet created. The employee can open any of the forms to progress and complete the inspection. The employee can create a copy of an ongoing inspection at the last saved state to start a new inspection report. The employee can generate inspection reports by filling out on-going or new inspection forms. The on-going inspections include inspections including defects that have not all been resolved. The employee can mark defects as resolved in the on-going inspection forms. The employee can copy/add/delete/edit the form fields data on the inspection forms. Once complete the inspection form can be generated into an inspection report by converting all the form fields into read-only elements. Once generated into an inspection report the employee can copy and amend the original inspection form to add/delete/edit any inspection data. In some embodiments, multiple employees can enter inspection data on an inspection form associated with the same track system at the same time. The system can sync all the data from all the different inspection forms from the different employees to generate a single inspection report associated with the track system. For example, the system can detect the different inspection forms are associated with the same track system based on identification information associated with the track system and are being filled out within a predetermined time period. The system can capture the completed form fields and generate a single inspection report including all the completed form fields.

In response to navigating to new inspection, the employee can be prompted to start a new inspection report and input field inspection information. The employee can enter the yard/facility name, client name, job number, or any other data. The user name and data will be automatically filed. The employee can save the data before proceeding. Once the inspection report is saved, the inspection report will be marked ongoing inspection list, until the inspection report is completed, in which case it will be saved in the past inspections list. Subsequent to inputting the field inspection information, the employee can be prompted to complete a track asset form, track defect form, turnout asset form, turnout defect form, grade crossing asset form, grade crossing defect form, bridge asset form, and/or bridge defect form. The form can include text input, radio button selections, file upload, reset button, drop down menus, and selection buttons. Furthermore, the forms can contain form fields such as user input, autofill fields, GPS data to record GPS location of each track asset and defect and the ability to upload and attach images captured by the first computing system. In some embodiments, a Google Maps Application Program Interface (API) can be used for determining GPS data. Geo Tagging can also be used for inputting GPS data of each track asset and defect. For example, as mentioned above, the first computing system can capture images using the image capturing device. The first computing system can also include a location module. In some embodiments, the employee can capture an image of the track and/or inspection area. The location module can determine the GPS location of the first computing system and embed and/or geo-tag the GPS location in the captured image. The GPS location can also be viewed on a map by clicking the view location button. The employee can upload and attach the captured image with the embedded and/or geo-tagged GPS location of the first computing system, in the inspection report. Some of the fields of the track asset form can be mandatory and some can initiate additional fields for user input. The employee can save the progress of each form at any time during the process.

Once the employee has completed inputting information in the forms, the employee can be prompted to preview/save/complete inspection work on the user interface. The employee can preview the inspection report in a pdf format. The preview can be viewed as a read-only file. In exemplary embodiments, the form can be in HTML format, the form can be converted from HTML to a pdf format and displayed on the user interface in a pdf format. In response to the employee saving the inspection, the inspection report will be saved as an on-going inspection until the inspection has been completed. In which case the inspection report will be marked as a past inspections. As mentioned above, once the employees saves the inspection report form is converted into an inspection report by converting the completed form fields into read-only elements. The employee's name and date stamp can be captured when the employee saves the inspection report. The employee can only save as inspection report if all the mandatory fields are completed. If missing fields are detected, a message indicating the missing fields can be listed on the messaging interface, if the employee attempts to save the inspection report. A single inspection can have multiple employee usernames associated to different assets and/or defects entered depending on the employee who filled out the form.

An employee can also update or amend to previous inspection reports when in-field track work repairs have been done or new defects are found. An employee can open the latest version of previous inspection reports to change the "not started" status of defect items as "complete" or "in-progress". If status is changed to "in-progress", the employee will input the remaining quantity that is left to be repaired. The employee can also add a new defect to the reports using the various defect forms. The employee then saves the updated inspection reports.

In some embodiments, the user can be authenticated as a client. Upon logging in as a client, the client can be presented with a list of all FRA 213 regulations listed by section and subsection, number and title on the user interface. The client can search by title text to display result lists and the user can select a specific title to open a section in pdf format. In response to navigating to the help selection, the client can be presented a stack text page instructing the client on how to use the application. An e-mail contact administrator and/or phone number can also be available to the client.

The client can also navigate to the job list. The client's job list can list all client's inspections in chronological order. The clients can be limited to have access to their inspection reports as assigned by the administrator. The client can search for inspection reports by project and/or facility name. The client can select an inspection report for view. The inspection report can be presented on the user interface. The client can view all the data on the inspection report for each inputted asset and/or defect. The inspection report can be sorted by one or more categories such as: date, alphabetical order, job number and/or facility name. Otherwise the list can also be sorted by one or more of the following categories: track ID, defect component (rail, ties, OTM, geometry, ballast/subgrade, appliances, etc.), priority rating, work status (not started, in-progress, or completed), specific date completed, year completed, switch ID, specific switch component, crossing ID, specific crossing component, bridge ID, and/or specific bridge component. Photos can be viewed by selecting the view photo button and the location can be viewed for each asset and/or defect based on the GPS location, by selecting the view location button. The client can transmit inspection report as an e-mail attachment in pdf format. In some embodiments, the user can be authenticated as an administrator. The administrator can access the application and can navigate to user management, form management, data management and FRA 213 management using the user interface. In response to navigating to, user management, the administrator can view, edit, remove user accounts. The administrator may not be able to access user passwords. The administrator can be notified of a new user registration. The new user can be an employee or a client. The administrator can manually verify, or unlock the employee registration. Once the administrator verifies the new employee, the new employee can receive an approval email, and can be able to access the application. The system can generate an email to be sent to a new client with a system generated password. The administrator can access the databases containing the user information and export the users (employees and clients) into a comma separated values file (.csv). In response to the navigating to form administration, the administrator can add, remove or edit form fields from each form. The administrator can also add, remove or edit drop down list entries. In response to navigating to data management, the administrator can access all form data. The administrator can further edit, delete and/or add backend data tables and table entries. The data can be exported from the data tables into .csv files The administrator can filter forms by client, employee and export all the forms into a .csv file. The administrator can access all completed reports. In response to navigating to FRA 213 management the administrator can input section and section titles. The pdf file associated with each section can be uploaded. The administrator can delete section associated with the pdf file. The administrator can only control users/data/form content for their respected regions. In some embodiments, the user can be authenticated as a super administrator. The super administrator can access and add to/delete/edit all region's application content.

Figure 2:
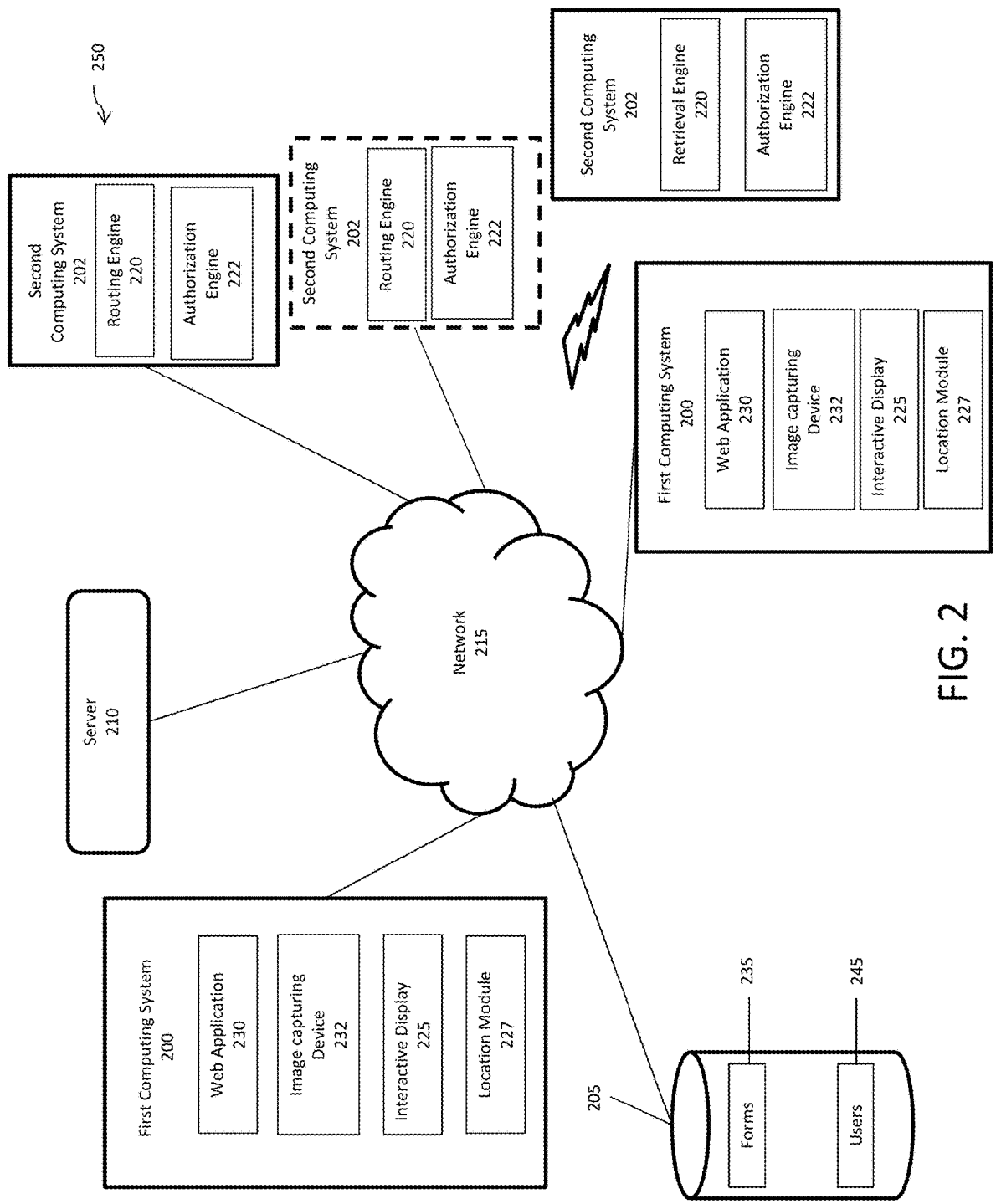
FIG. 2 illustrates an exemplary network environment suitable for the maintenance data generation system, in accordance with an exemplary embodiment.

FIG. 2 illustrates an exemplary network environment suitable for the maintenance data generation system, in accordance with exemplary embodiments. The maintenance data generation system 250 can include a database 205, one or more of first computing systems 200, and one or more of the second computing systems 202. In one exemplary embodiment, the first computing system 200 can be in communication with the database(s) 205, and the second computing system 202, via a communications network 215.

The first computing system 200 can include an interactive display 225, an image capturing device 232 and a location module 227. The location module 227 can be configured to determine the Global Positioning System (GPS) location of the first computing system 200 and/or generate location data associated with the first computing system 200. The location module 227 can determine GPS coordinates of the first computing system 200. The location module 227 can be any device such as a satellite signal receiver which can receive GPS signals or any other radio signals originating from satellites which can be used to determine location. The location module 227 can include a radio receiver for receiving ground based radio signals, such as GPRS signals or any 2G, 3G, 4G, LTE or other types of radio signal generation cellular systems which can be used along with triangulation software to generate location information. The location module 227 can also include a wireless signal receiver and/or transmitter, a computer, a network of computers (e.g. the Internet), a satellite, a compass, a gyroscope, or any combination of such which can generate or be used to generate location information. The image capturing device 232 can be configured to capture still or moving images. The first computing system 200 can include an interactive display 225. The first computing system 200 can implement at least one instance of the web application 230 on the interactive display 225. The second computing system 202 can implement at least one instance of the retrieval engine 220 and authorization engine 222.

In an example embodiment, one or more portions of the first and second communications network 215, 217 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 and/or the second computing system 202 includes one or more computers or processors configured to communicate with the second computing system 202 and the databases 205, via the network 215. The server 210 hosts one or more applications configured to interact with one or more components of the second computing system 202 and/or facilitates access to the content of the databases 205. In some embodiments, the server 210 can host the retrieval engine 220 or the authorization engine 222 or portions thereof. The databases 205 may store information/data, as described herein. For example, the databases 205 can include a user's database 245 and the forms database 235. The users database 245 can store user account information. The forms database 245 can include forms associated with inspection and customer reports. The databases 205 and server 210 can be located at one or more geographically distributed locations from each other or from the computing system 200. Alternatively, the databases 205 can be included within server 210.

In exemplary embodiments, a user can operate the first computing system 200. The first computing system 200 can be a mobile device. The user can execute an instance of the web application 230 on the first computing system 200. As mentioned above, the web application 230 can be used to generate, access, view inspection reports on the interactive display 225. The inspection reports can be directed to railway track inspections for maintenance. The web application 230 can prompt the user to input a username and password and/or create a new account. The web application 230 can encode the username and password and transmit encoded username and password to the second computing system 202. The second computing system 202 can execute the authorization engine 222 in response to receiving the encoded username and password. The authorization engine 222 can decode the username and password and query the users database 245 to authenticate the user. Once the username and password is authenticated, the authorization engine 222 can transmit a message to the web application 230 to authorize the user to proceed using the application. Otherwise, in response to the authorization engine 222 being unable to authenticate the username and password, the authorization engine 222 can transmit a message to the web application 230, to prompt the user to re-enter a valid username and password.

Once the user is authenticated, the user can be navigated to a dashboard on the web application 230. The user can be authenticated as an employee, client, or administrator. In response to the user being authenticated as an employee, the dashboard can provide the ability to create a new inspection report, retrieve an incomplete report, and/or view a past inspection report. The employee can also search for incomplete reports and past reports using various filters, such as client/project name/yard or facility name. The employee can also filter for only viewing past and incomplete inspection report by a particular employee. The employee can input the filters in the web application 230 and the web application 230 can transmit the filters and request to retrieve incomplete or past inspection reports to the second computing system 202. The second computing system 202 can execute the retrieval engine 220 in response to receiving the request and filters associated with the request. The retrieval engine 220 can query the forms database 235 to retrieve the incomplete and/or past inspection reports based on the filters. The retrieval engine 220 can transmit the list of returned incomplete and/or past inspection reports to the web application for presentation on the interactive display 225.

The employee can select and view each of the inspection reports from the list of incomplete and/or past inspection reports. The past inspection reports can be viewed by the employee in a read-only format. For example, a past inspection report can be presented on the interactive display 225 as in an un-editable PDF format. The employee can select an incomplete inspection report, and the employee can be automatically directed to the incomplete portions of the incomplete inspection report. The employee can be presented empty form fields, such as alphanumeric input, drop down fields and/or radio buttons. The employee can complete some or all of the incomplete fields. In the event the employee completes the all of the fields and marks the inspection form as complete, the employee can mark the inspection form as a completed form and the web application 230 can transmit the completed fields to the retrieval engine 220. The retrieval engine 220 can update the forms database 235 with the updated fields. The retrieval engine 220 can remove write permissions in the database for the inspection report for any employee, in the forms database 235. The retrieval engine 220 can username and date stamp can be printed on the inspection form once the inspection form is completed. In the event, the employee does not complete all the required incomplete fields in the inspection form, the web application 230 may not allow the employee to mark the inspection form as completed. The web application 230 can prompt the employee to complete the required incomplete fields in the form, or save the inspection form as incomplete. In response to saving the inspection form as incomplete, the updated fields can be transmitted by the web application 230 to the retrieval engine 220. The updated fields can be stored in the forms database 235. The retrieval engine 220 can maintain the read and write permissions for the incomplete forms for the employees. The employee can also preview the inspection report whether the report is complete or incomplete before submitting the inspection report to the retrieval engine 220. In response to selecting preview, the updated fields will not be saved in the forms database 235, however, the inspection report displayed on the interactive display 225 will be converted and displayed as an un-editable pdf file. The employee can also generate a copy of the past and/or incomplete inspection reports. The copies of the reports can be copied into editable files containing the same data and information as the original copy. The copy of the inspection report can be saved in the forms database 235 as a newly completed inspection report.

In some embodiments, the employee can capture an image at a location for which a past and/or incomplete inspection report had been generated. The location module 227 can determine the location data (including GPS coordinates) of the first computing system 200 in response to capturing the image or clicking the "add location" button. The first computing system 200 can transmit the location data to the second computing system 202. The second computing system 202 can execute the retrieval engine 222 in response to receiving the location data of the first computing system 200. The retrieval engine 222 can retrieve all the past and/or incomplete inspection reports based on the location data and transmit the past and/or incomplete inspection reports to the first computing system 200. The first computing system 200 can automatically execute the web application 200 in response to receiving the past and/or incomplete inspection reports based on the location and present the past and/or incomplete inspection reports on the interactive screen 225.

In the event the employee wants to generate a new inspection report, the retrieval engine 220 can query the forms database 235 to retrieve one or more blank forms to be presented to the employee on the interactive display 225. The forms can be one or more of: track asset form, track defect form, turnout asset form, turnout defect form, grade crossing asset form, grade crossing defect form, bridge asset form, and/or bridge defect form. The employee can complete the forms by completing the alphanumeric input fields, autofill fields, drop down fields and/or radio buttons. The employee can also use the image capturing device 232 to capture an image at the location of the inspection. The first computing system 200 can detect the location data (including GPS coordinates) at the time the image is captured using the location module 227 on the first computing system 200. The web application 230 can embed and/or geotag the image with the location data. Geotagging is the process of adding geographical identification metadata to various media such as a geotagged photograph or video, websites, SMS messages, QR Codes or RSS feeds and is a form of geospatial metadata. This data usually consists of latitude and longitude coordinates, though they can also include altitude, bearing, distance, accuracy data, and place names, and perhaps a time stamp. The geotagged image can be uploaded and attached to the various forms. The employee can complete all of the required fields mark the inspection report as completed. The web application 230 can transmit the completed inspection report and field values to the retrieval engine 220. The retrieval engine 220 can the newly completed inspection report in the forms database 235. The retrieval engine 220 can remove the read or write access for the completed inspection report for all employees. In the event, the employee does not complete all the required fields in the inspection form, the web application 230 may not allow the employee to mark the inspection form as completed. The web application 230 can prompt the employee to complete the required incomplete fields in the form, or save the inspection form as incomplete. In response to saving the inspection form as incomplete, the updated fields can be transmitted by the web application 230 to the retrieval engine 220. The updated fields can be stored in the forms database 235. The retrieval engine 220 can maintain the read and write permissions for the incomplete forms for the employees. The employee can also preview the inspection report whether the report is complete or incomplete before submitting the inspection report to the retrieval engine 220. In response to selecting preview, the updated fields will not be saved in the forms database 235, however, the inspection report displayed on the interactive display 225 will be converted and displayed as an un-editable pdf file. The employee can also generate a copy of the past and/or incomplete inspection reports. The copies of the reports can be copied into editable files containing the same data and information as the original copy. The copy of the inspection report can be saved in the forms database 235 as a newly completed inspection report.

In some embodiments, the retrieval engine 220 can receive a completed inspection report and extract all of the field values from the forms of the completed inspection report. The retrieval engine 220 can calculate an estimate pricing value based on the extracted field values and transmit the estimated pricing value to the web application 230 to be displayed on the interactive display 225. The retrieval engine 220 can also convert the completed inspection report into customer reports viewable for clients. In one example, the retrieval engine 220 can remove one or more fields from the forms when generating the customer reports. Alternatively, all of the fields can be included in the customer reports.

As mentioned above, a user can be authenticated as a client and/or customer. The client can only have read-only access to customer reports. The client can view a list of all of the customer reports available for view or search customer reports based on certain filters such as project name/facility name. The web application 230 can transmit the request to view customer reports based on the filters to the second computing system 202. The second computing system 202 can execute the retrieval engine 222 in response to receiving the request for the customer reports based on the filters. The retrieval engine 222 can query the forms database 235 for customer reports view able to the client based on the filters. The retrieval engine 222 can transmit the customer reports to the web application 230. The web application 230 can display a list of the customer reports. The client can select and view each customer report in the list. The customer report can be a read-only pdf file.

As mentioned above, the user can be authenticated as an administrator. The web application 230 can present a different dashboard for the administrator. The administrator can request information regarding any user in the user database 245 for their region and can request any information regarding the incomplete and completed inspection reports from the forms database 235 for their region. The administrator can have read and write privilege for the data stored in the user database 245 and the forms database 235 for their region. The second computing system 202 can receive the request to retrieve and/or update the user database 245 and/or the forms database 235 from the web application 230 for their region. The second computing system 202 can execute the retrieval engine 220 in response to receiving the request. The retrieval engine 220 can retrieve the requested data from the user database 245 and/or forms database 235 or update the databases with the data transmitted by the web application 230 for their region As mentioned above, the user can be authenticated as a super administrator. The web application 230 can present a different dashboard for the super administrator. The administrator can request information regarding any user in the user database 245 for all regions and can request any information regarding the incomplete and completed inspection reports from the forms database 235 for all regions. The administrator can have read and write privilege for the data stored in the user database 245 and the forms database 235 for all regions. The second computing system 202 can receive the request to retrieve and/or update the user database 245 and/or the forms database 235 from the web application 230 for their region. The second computing system 202 can execute the retrieval engine 220 in response to receiving the request. The retrieval engine 220 can retrieve the requested data from the user database 245 and/or forms database 235 or update the databases with the data transmitted by the web application 230 for their region The web application 230 can access a web portal using a URL. The web portal can be accessed using mobile or desktop internet browsers. The web application can operate on iOS and Android devices. The file packages or files .ipa and .apk are required for enterprise release on MobileIron. In some embodiments, the retrieval engine 220 can convert the editable form into a read-only pdf file. The editable form can be an HTML or XML form. The retrieval engine 220 can execute data conversion of the editable and non-editable fields on the HTML or XML form into a read-only pdf file by using character encoding. Character encoding is the process of changing the bits of one file from one format to another. The retrieval engine 220 can convert each bit of the HTML or XML to a format corresponding to a read-only pdf file.

Figure 3:
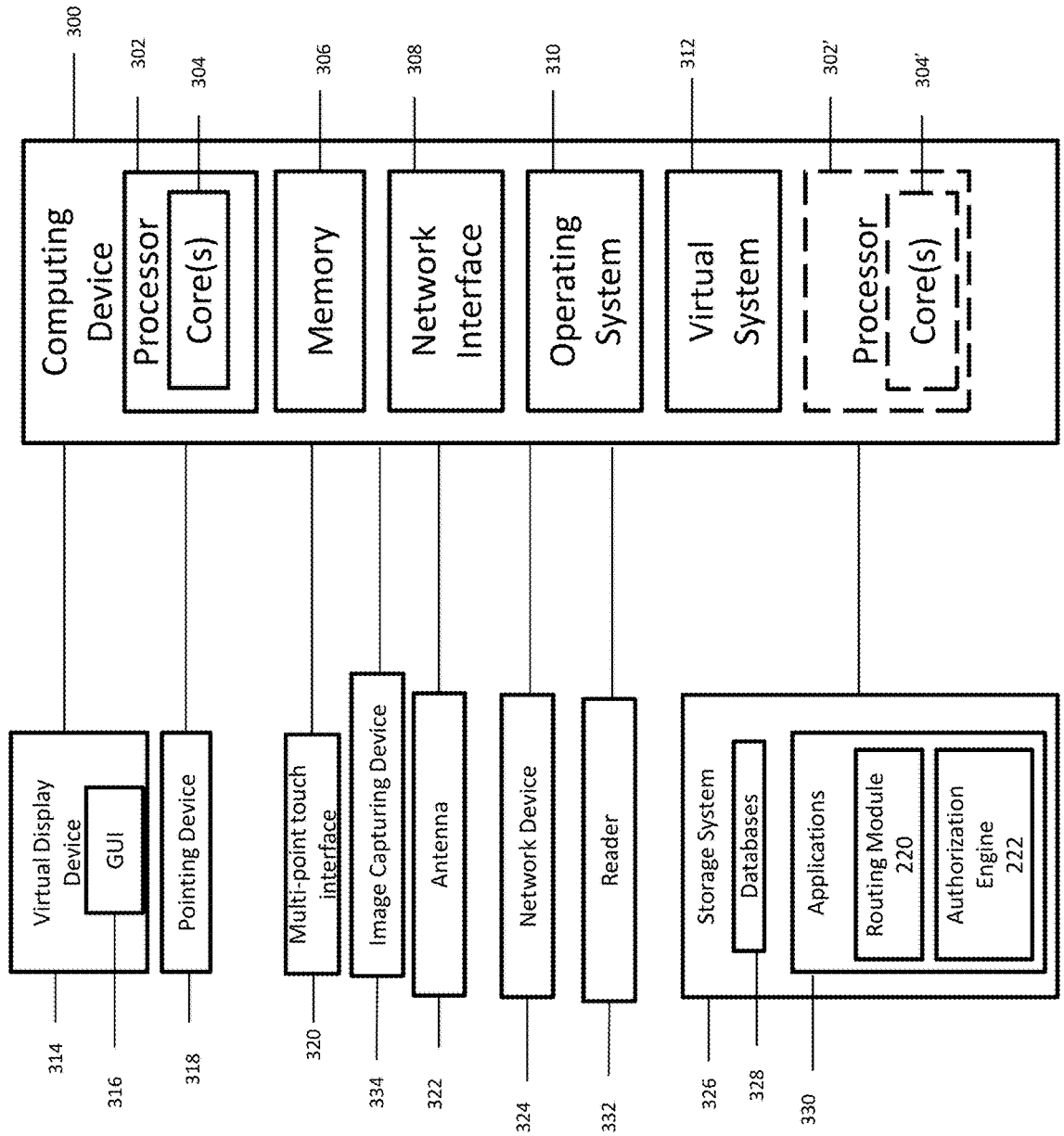
FIG. 3 illustrates an exemplary computing system in accordance with an exemplary embodiment.

FIG. 3 is a block diagram of an example computing device for implementing an exemplary embodiment. Embodiments of the computing device 300 can execute the identification engine and the retrieval engine. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as authorization engine 222 and retrieval engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 406 may include other types of memory as well, or combinations thereof.

A user may interact with the computing device 300 through a visual display device 314, such as a computer monitor, which may display one or more graphical user interfaces 316, multi touch interface 320, a scanner 332, a printer 334 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding the physical objects and instructions. The databases 328 may be updated manually or automatically at any suitable time to add, delete, and/or update one or more data items in the databases. The databases 328 can include information such as the forms database 235 and the user database 245.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 300 and performing the operations described herein. In exemplary embodiments, the operating system 310 may be run in native mode or emulated mode.

In an exemplary embodiment, the operating system 310 may be run on one or more cloud machine instances.

Figure 4:
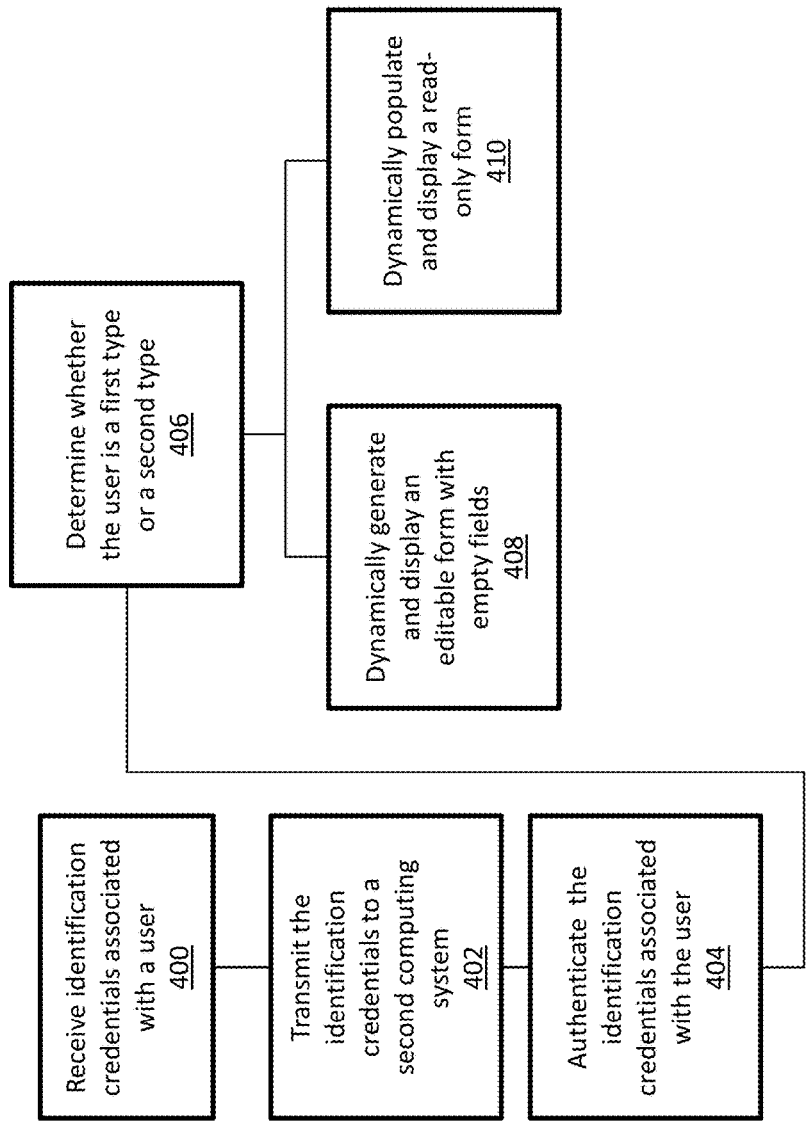
FIG. 4 illustrates a flowchart of an exemplary sequence for generating maintenance data in an exemplary embodiment.

FIG. 4 illustrates a flowchart of an exemplary sequence for generating maintenance data in an exemplary embodiment. In operation 400, a first computing system (e.g. first computing system 100 and 200 as shown in FIGS. 1A and 2) can receive identification credentials associated with a user. The first computing system can include a web application (e.g. web application 230 as shown in FIG. 2), an image capturing device (e.g. image capturing device 108, 232 as shown in FIGS. 1A and 2), an interactive display (e.g. interactive display 102, 225 as shown in FIGS. 1A and 2) and a location module (e.g. location module 227 as shown in FIG. 2). In operation 402, the first computing system can transmit the identification credentials to a second computing system (e.g. second computing system 202 as shown in FIG. 2). The second computing system can receive the identification credentials associated with the user. The second computing system can execute the authorization engine (e.g. authorization engine 222 as shown in FIG. 2) in response to receiving the identification credentials. In operation 404, the authorization engine can authenticate the identification credentials associated with the user. In operation 406, the authorization engine can determine whether the user is a first type or a second type in response to authenticating the identification credentials associated with the user. In some embodiments, the first type is an employee, and the second type is a customer/client. The user can also be an administrator. The second computing system can execute the retrieval engine (e.g. retrieval engine 220 as shown in FIG. 2) in response to determining the type of the user. In operation 408, the retrieval engine can dynamically generate and display an editable form with empty fields, on the interactive display of the first computing system, in response to determining the user is of a first type. In operation 410, the retrieval engine can dynamically populate and display a read-only form on the interactive display of the first computing system, in response to determining the user is of a second type.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system for generating maintenance data, the system including:
   a first computing system including an interactive display, the first computing system programmed to:
      display, via the interactive display of the first computing system, a first inspection form with a plurality of fields, wherein the first inspection form is associated with an inspection of a track system and includes one or more defect items and a status of whether the one or more defects items are complete, partially complete, or incomplete, and
      receive at least one response by the first computing device, the at least one response entered into at least one field of the plurality of fields;
   a second computing system including an interactive display, the second computing system programmed to:
      display, via the interactive display of the second computing system, a second inspection form with a plurality of fields, wherein the second inspection form is associated with the inspection of the track system and includes one or more defect items and a status of whether the one or more defects items are complete, partially complete, or incomplete, and
      receive at least one response by the second computing system, the at least one response entered into at least one field of the plurality of fields; and
   a third computing system including a server and a database storing a plurality of inspection forms and communicatively coupled to the first and second computing systems, the third computing system programmed to:
      capture the at least one response entered into the first inspection form;
      capture the at least one response entered into the second inspection form; and
      sync the at least one response entered into the first inspection form and the at least one response entered into the second inspection form to generate a single inspection report associated with the inspection of the track system.

2. The system of claim 1, wherein the first computing system further comprising a GPS location module.

3. The system of claim 2, wherein the third computing system is further programmed to determine a location of the first computing system.

4. The system of claim 3, wherein the third computing system is further programmed to:
   query the database to retrieve the first inspection form based on the location information of the first computing system; and
   displaying the first inspection form on the interactive display of the first computing system.

5. The system of claim 1, wherein the third computing system is further programmed to:
   query the database to retrieve the plurality of inspection forms based on identification credentials of a user; and
   display the plurality of inspection forms for selection on the interactive display of the first computing system.

6. The system of claim 5, wherein the first computing system is further programmed to:
   transmit a selection of at least one inspection form of the plurality of inspection forms; and
   display the at least one inspection form on the interactive display of the first computing system.

7. The system of claim 1, wherein the first computing system is further programmed to:
receive input from a user to complete the plurality of fields of the first inspection form, in response to displaying the first inspection form, wherein the at least one inspection form is editable;
encode data in the plurality of fields of the first inspection form;
transmit the encoded data to the third computing system.

8. The system of claim 7, wherein the third computing system is further programmed to:
receive the encoded data from the first computing system;
decode the encoded data; and
store the decoded data in the database.

9. The system in claim 7, wherein a request for information is included for the encoded data.

10. The system in claim 9, wherein the third computing system is further programmed to:
receive the request for information and the encoded data from the first computing system;
decode the encoded data;
calculate the request for information based on the encoded data; and
display the request for information on the interactive display of the first computing system.

11. The system in claim 8, wherein the third computing system is further programmed to:
generate a read-only inspection form based on the decoded data; and
store the read-only inspection form in the database.

12. The system in claim 2, wherein the third computing system is further programed to:
query the database to retrieve at least one inspection form based on identification credentials of the user and location of the first computing system, wherein the at least one inspection form is read-only;
display the at least one read-only inspection form on the interactive display of the first computing system.

13. The system of claim 1, wherein the third computing system is further programed to:
query the database to retrieve more than one inspection form based on identification credentials of the user, wherein the at least one inspection form is read-only;
display more than one inspection form on the interactive display of the first computing system for the selection from the user.

14. The system of claim 13, wherein first computing system is further programmed to:
transmit a selection of at least one inspection form from the selection of more than one inspection form displayed on the interactive display of the first computing system; and
display the at least one inspection form from the selection of more than one inspection form, on the interactive display of the first computing system.

15. The system of claim 1, wherein the plurality of inspection forms are a plurality of railroad track inspection forms.

16. The system of claim 15, wherein the inspection forms include one or more of: track asset form, track defect form, turnaround asset form, turnaround defect form, grade crossing asset form and grade crossing defect form.

17. The system of claim 9, wherein the requested information is an estimated price for repair of a railroad track.

18. The system of claim 1, wherein the fields include one or more of: text input, radio button selections, file upload, reset button, drop down menus, and selection buttons.

19. The system of claim 2, further comprising an image capturing device operatively coupled to the first computing system configured to capture images.

20. The system of claim 19, wherein the first computing system is configured to:
upload an image captured by the image capturing device onto the at least one inspection form displayed on the interactive display;
determine the location of the first computing system; and
embed the location of the first computing system in the uploaded image.

21. The system of claim 1, wherein the first computing system is at least one of: an internet appliance, a hand-held device, a wireless device, a portable device, a wearable computer, a cellular or mobile phone, a portable digital assistants (PDAs), a smart phone, a tablets, an ultrabook, a netbook, a laptop, or some other electronic device equipped with internet accessibility.

22. The system of claim 1, the third computing system further programmed to detect that the first inspection form and the second inspection form are associated with the track system based on at least one of identification information associated with the track system or the first inspection form and the second inspection form are filled out within a predetermined time period.

23. A method for generating maintenance data, the method including:
displaying, via an interactive display of a first computing system, a first inspection form with a plurality of fields, wherein the first inspection form is associated with an inspection of a track system and includes one or more defect items and a status of whether the one or more defects items are complete, partially complete, or incomplete;
receiving at least one response by the first computing device, the at least one response entered into at least one field of the plurality of fields;
displaying, via an interactive display of a second computing system, a second inspection form with a plurality of fields, wherein the second inspection form is associated with the inspection of the track system and includes one or more defect items and a status of whether the one or more defects items are complete, partially complete, or incomplete, and
receiving at least one response by the second computing system, the at least one response entered into at least one field of the plurality of fields; and
capturing, via a third computing system including a server and communicatively coupled to the first and second computing systems, the at least one response entered into the first inspection form;
capturing, via the third computing system, the at least one response entered into the second inspection form; and
syncing, via the third computing system, the at least one response entered into the first inspection form and the at least one response entered into the second inspection form to generate a single inspection report associated with the track system.

* * * * *